United States Patent [19]
Oka

[11] Patent Number: 6,051,660
[45] Date of Patent: Apr. 18, 2000

[54] POLYACETAL RESIN MOLDINGS AND PROCESS FOR PRODUCING THE SAME

[75] Inventor: Mikio Oka, Kurashiki, Japan

[73] Assignee: Asahikasei Kogyo Kabushiki Kaisha, Osaka, Japan

[21] Appl. No.: 09/011,817

[22] PCT Filed: Aug. 30, 1996

[86] PCT No.: PCT/JP96/02440

§ 371 Date: Feb. 12, 1998

§ 102(e) Date: Feb. 12, 1998

[87] PCT Pub. No.: WO97/09381

PCT Pub. Date: Mar. 13, 1997

[30] Foreign Application Priority Data

Sep. 1, 1995 [JP] Japan ................................ 7-225316

[51] Int. Cl.[7] .............................. C08L 59/00; C08K 5/34; C08C 19/22

[52] U.S. Cl. .......................... 525/375; 525/398; 524/405; 524/413; 524/593

[58] Field of Search .................................... 525/375, 398; 524/405, 413, 593

[56] References Cited

U.S. PATENT DOCUMENTS

| | | | |
|---|---|---|---|
| 4,087,411 | 5/1978 | Sugio et al. ............................ | 525/400 |
| 4,446,205 | 5/1984 | Mizuno et al. . | |
| 4,506,053 | 3/1985 | Sakurai et al. .......................... | 524/405 |
| 4,526,921 | 7/1985 | Sakurai et al. .............................. | 99/39 |
| 4,578,422 | 3/1986 | Sakurai et al. ........................... | 524/593 |
| 4,666,995 | 5/1987 | Auerbach et al. ....................... | 525/400 |
| 4,689,373 | 8/1987 | Auerbach et al. ....................... | 525/398 |
| 4,758,608 | 7/1988 | Collins et al. ............................. | 522/43 |
| 5,206,290 | 4/1993 | Mizuno et al. .......................... | 525/134 |
| 5,266,471 | 11/1993 | Schmitt .................................... | 435/178 |
| 5,405,917 | 4/1995 | Mueller, Jr. et al. ................. | 525/333.8 |

FOREIGN PATENT DOCUMENTS

| | | |
|---|---|---|
| 0520820 A2 | 12/1992 | European Pat. Off. . |
| 52-33943 | 3/1977 | Japan . |
| 56-18640 | 2/1981 | Japan . |
| 57-102943 | 6/1982 | Japan . |
| 59-33353 | 2/1984 | Japan . |
| 60-90250 | 5/1985 | Japan . |
| 2-80416 | 3/1990 | Japan . |
| 6-192540 | 10/1993 | Japan . |
| 7-173368 | 12/1993 | Japan . |
| 6-340792 | 12/1994 | Japan . |
| 7-331028 | 12/1995 | Japan . |

*Primary Examiner*—David W. Wu
*Assistant Examiner*—Tanya Zalukaeva
*Attorney, Agent, or Firm*—Pennie & Edmonds LLP

[57] ABSTRACT

A polyacetal resin molded article excellent in thermal aging resistance and surface appearance of molded article in which an amino-substituted triazine compound is dispersed in the form of particles having an average particle size of not more than 1 μm in a polyacetal resin, which molded article is obtained by melt-kneading a polyacetal resin having a formaldehyde content of 1,000 to 3,000 with an amino-substituted triazine compound for a time of 250 seconds or less.

10 Claims, No Drawings

POLYACETAL RESIN MOLDINGS AND PROCESS FOR PRODUCING THE SAME

TECHNICAL FIELD

This invention relates to a polyacetal resin molded article in which an amino-substituted triazine compound is dispersed in the form of particles having an average particle size of not more than 1 μm in a polyacetal resin and to a process for producing the same.

BACKGROUND ART

Polyacetal resins are excellent in balance of mechanical properties, chemical resistance and coefficient of friction, and therefore, have been used as typical engineering plastics over a wide range including electric and electronic parts, automobile parts and other mechanical parts. When so used, thermal aging resistance and surface appearance of molded article are important characteristics.

Polyacetal resin compositions prepared by adding an amino-substituted triazine compound to a polyacetal resin are already known. For example, Japanese Patent Application Kokai No. 60-90,250, Japanese Patent Application Kokai No. 7-173,368 and Japanese Patent Application No. 7-331,028 disclose polyacetal resin compositions for the purpose of improving the thermal stability. Also, Japanese Patent Application Kokai No. 2-80,416 discloses a method of the addition of the above compound to a crude polyacetal resin before the terminal stabilization for the purpose of enhancing the compatibility with the polyacetal resin.

However, in these methods, the amino-substituted triazine compound is poor in compatibility with a polyacetal resin, and hence, cannot be dispersed in the form of particles having an average particle size of not more than 1 μm in the polyacetal resin. In addition, when the molded article is allowed to stand for several days, the compound bleeds to the surface of the molded article resulting in bad surface appearance. On the other hand, Japanese Patent Application Kokai No. 2-80,416 discloses a method of improving the non-bleeding properties of an amino-substituted triazine compound. However, by this method, it is impossible to obtain a polyacetal resin molded article in which the amino-substituted triazine compound is dispersed in the form of particles having an average particle size of not more than 1 μm in the polyacetal resin. This is because the time of melt-mixing the polyacetal resin with melamine is long and hence formaldehyde reacts with the melamine and the reaction products further react with each other and aggregate, whereby the particle sizes of dispersed particles become larger.

DISCLOSURE OF THE INVENTION

The present inventors have made extensive research on the above problems and consequently found that a polyacetal resin molded article excellent in thermal aging resistance, surface appearance and dimensional precision can be obtained by dispersing an amino-substituted triazine compound in the form of particles having a specific average particle size in a polyacetal resin.

An object of this invention is to provide a polyacetal resin molded article in which an amino-substituted triazine compound is dispersed in the form of particles having an average particle size of not more than 1 μm in the polyacetal resin.

A further object of this invention is to provide a process for producing the above polyacetal resin molded article.

A still further object of this invention is to provide a polyacetal resin molded article excellent in thermal aging resistance and surface appearance and having non-bleeding properties.

Other objects and advantages of this invention will become apparent from the following description.

According to this invention, there is provided a polyacetal resin molded article in which an amino-substituted triazine compound is dispersed in the form of particles having an average particle size of not more than 1 μm in the polyacetal resin.

According to this invention, there is also provided a process for producing a polyacetal resin molded article which comprises melt-mixing 100 parts by weight of a polyacetal resin having a formaldehyde content of 1,000 to 3,000 ppm with 0.01 to 3.0 parts by weight of at least one amino-substituted triazine compound and subjecting the mixture to molding.

BEST MODE FOR CARRYING OUT THE INVENTION

The polyacetal resin used in this invention includes oxymethylene homopolymer composed substantially of oxymethylene units prepared using as the starting material a cyclic oligomer such as formaldehyde monomer or its trimer (trioxane) or tetramer (tetraoxane) or the like; oxymethylene copolymers having 0.1 to 20% by weight of oxyalkylene units having 2 to 8 carbon atoms prepared from ethylene oxide, propylene oxide, epichlorohydrin, 1,3-dioxulan, 1,4-butanediol or the like; molecular weight-branched oxymethylene copolymers; and oxymethylene block copolymers comprising less than 50% by weight of a diverse polymer unit containing at least 50% by weight of an oxymethylene recurring unit.

Comonomers such as ethylene oxide, propylene oxide, epichlorohydrin, 1,3-dioxulan, 1,4-butanediol and the like may have added thereto a phenol type antioxidant, which includes, for example, n-octadecyl 3-(3',5'-di-t-butyl-4'-hydroxyphenyl)propionate, n-octadecyl 3-(3'-methyl-5'-t-butyl-4'-hydroxyphenyl)propionate, n-tetradecyl 3-(3',5'-di-t-butyl-4'-hydroxyphenyl)propionate, 1,6-hexanediol bis(3-(3,5-di-t-butyl-4-hydroxyphenyl)propionate), 1,4-butanediol bis(3-(3,5-di-t-butyl-4-hydroxyphenyl) propionate), triethylene glycol bis(3-(3'-t-butyl-5'-methyl-4'-hydroxyphenyl)propionate), tetrakis-(methylene-3-(3',5'-di-t-butyl-4'-hydroxyphenyl)propionate)methane, 3,9-bis(2-(3-(3'-t-butyl-4'-hydroxy-5'-methylphenyl)propionyloxy)-1, 1-dimethylethyl)-2,4,8,10-tetraoxaspiro(5,5)undecane, N,N'-bis-3-(3',5'-di-t-butyl-4'-hydroxphenyl)propionyl hexamethylenediamine, N,N'-tetramethylene bis-3-(3'-methyl-5'-t-butyl-4'-hydroxphenyl)propionyldiamine, N,N'-bis(3-(3',5'-di-t-butyl-4'-hydroxphenyl)propionyl) hydrazine, N-salicyloyl-N'-salicylidenehydrazine, 3-(N-salicyloyl)amino-1,2,4-triazole, N,N'-bis(2-(3-(3,5-di-butyl-4-hydroxyphenyl)-propionyloxy)ethyl)oxyamide and the like. These antioxidants may be used alone or in combination of two or more.

The polyacetal resin can be produced by, for example, removing impurities having active hydrogen such as water, methanol, formic acid and the like contained in the starting monomer such as trioxane, cyclic ether or the like by distillation, adsorption or the like and then copolymerizing the resulting monomer and then pelletizing the polymer obtained by a twin screw extruder.

As a method of removing the active hydrogen compound from the starting monomer, there are, for example, a method comprising distilling trioxane or a cyclic ether in the presence of benzene to azeotropically distill the active hydrogen compound and benzene, an adsorption method comprising passing trioxane or an cyclic ether through a column packed with an adsorber such as zeolite or the like to remove the active hydrogen compound therefrom, and other methods.

The polymerization is conducted by bulk polymerization and can also be conducted by any of the batch system and continuous system. As the batch system polymerizer, a reactor equipped with a stirrer can generally be used. As the continuous system polymerizer, there can be used a self-cleaning type mixer such as a co-kneader, a twin screw type continuous extrusion kneader, a twin paddle type continuous mixer or the like. The polymerization conditions are such that the polymerization is effected at a temperature ranging from 60° C. to 200° C., preferably from 60° C. to 120° C. under atmospheric pressure.

The polymerization catalyst is boron trifluoride, boron trifluoride hydrate or a coordination complex compound of an organic compound containing an oxygen atom or a sulfur atom with boron trifluoride and is used in the gaseous state or in solution in a suitable organic solvent. Particularly preferable polymerization catalysts are the coordination complex compounds of organic compounds containing an oxygen atom or a sulfur atom with boron trifluoride. Specifically, boron trifluoride diethyl ether and boron trifluoride dibutyl ether are mentioned. These polymerization catalysts are used in a proportion of $1 \times 10^{-6}$ mole to $1 \times 10^{-3}$ mole per mole of a total of trioxane and cyclic ether.

The crude polyacetal resin thus obtained before terminal stabilization contains an active polymerization catalyst, and hence, the deactivation of the polymerization catalyst is preferred. The deactivation of the polymerization catalyst is effected in an aqueous solution containing a basic substance or an organic solvent. As the other deactivation method, there can be used a method which comprises adding a basic substance to the crude polyacetal resin and subjecting the resulting mixture in the molten state to deactivation of the polymerization catalyst by use of an extruder. The basic substance used in the deactivation includes hydroxides, inorganic weak acid salts, organic acid salts and the like of alkali metals and alkaline earth metals. Preferable are hydroxides, carbonates, phosphates, silicates, borates, formates, acetates, stearates, palmitates, propionates, oxalates and the like of Li, Na, K, Mg, Ca, Sr and Ba. Ammonia and amine compounds such as triethylamine, tributylamine and the like can also be used as the deactivator.

The polymer after the deactivation of the polymerization catalyst is pelletized by an extruder or the like. At this time, a hydroxyl group-containing compound or a mixture of these compounds may be injected into and kneaded with the polymer to terminally stabilize the polymer, or alternatively, the polymer mixture may simply be melted and then pelletized. When the hydroxyl group-containing compound or a mixture of these compounds is injected into and kneaded with the polymer, a basic substance such as triethylamine or the like may be added thereto as a pH-adjusting agent. At this time, the extruder temperature may be suitably varied in the range of from 190° C. to 230° C., but this temperature range is not critical. Among the polyacetal resins obtained by these methods, those having a formaldehyde content of 1,000 to 3,000 ppm are preferred.

With respect to the method of adjusting the formaldehyde content, for example, when a polyacetal resin having unstable terminal portions as obtained by copolymerizing trioxane and a cyclic ether such as ethylene oxide, 1,3-dioxolan or the like in the presence of a catalyst is used, the amount of formaldehyde contained in this polyacetal resin is measured and when the amount obtained is less than 1,000 ppm, the amount of formaldehyde liberated from the polymer terminals is increased by elevating the temperature for drying the polymer or other methods, whereby the targeted polyacetal resin can be obtained. Moreover, the targeted polyacetal resin can also be obtained by adding paraformaldehyde to the above polyacetal resin and melt-kneading the resulting mixture. On the other hand, when the formaldehyde content of the polyacetal resin is more than 3,000 ppm, the polyacetal resin targeted can be obtained by converting the polyacetal resin having said formaldehyde content to the molten state by an extruder or the like, injecting a hydroxyl group-containing compound or a mixture of these compounds into the molten polyacetal resin, kneading the resulting mixture, and further, adjusting the vent vacuum degree for releasing (volatilizing) the vapor of the injected hydroxyl group-containing compound and the free formaldehyde. On the other hand, when the polyacetal resin whose polymer terminals have been stabilized is used, the targeted polyacetal resin can be obtained by melt-kneading paraformaldehyde with the terminally stabilized polyacetal resin.

The amount of formaldehyde contained in the polyacetal resin can be quantitatively determined by the following method. For example, the polyacetal resin is added to HFIP (hexafluoroisopropanol) and the resulting mixture is kept at room temperature for 24 hours to completely dissolve the polyacetal resin in HFIP, thereafter an acetylacetone solution is added to the resulting solution to develop a color and the colored solution is subjected to quantitative determination by a UV spectrophoto meter. This method enables the quantification of the formaldehyde contained in the polyacetal resin, but does not quantify the formaldehyde liberated by decomposition of the unstable terminal portion of the polyacetal resin.

In the method of melt-kneading a polyacetal resin with an amino-substituted triazine compound, an extruder is generally used; however, this is not critical. Any means by which the mixture can be sufficiently melt-kneaded can be used. When an extruder is used, the extruder may be a single screw extruder or a twin screw one. The temperature at this time may be suitably varied in the range of from 170° C. to 240° C. The melt-kneading time is 250 sec or less, preferably 200 sec or less. When the melt-kneading time is more than 250 sec, the reaction of formaldehyde with the amino-substituted triazine compound contained in the polyacetal resin proceeds further, whereby the amino-substituted triazine compound is aggregated to increase the particle sizes of the dispersed particles.

When a mixture of an amino-substituted triazine compound with a methylolated amino-substituted triazine compound which is a reaction product of an amino-substituted triazine compound with formaldehyde or only the methylolated amino-substituted triazine compound is melt-kneaded with the polyacetal resin by means of an extruder, this methylolated amino-substituted triazine compound is reacted and aggregated in the extruder to block the dies of the extruder, whereby stable pelletization is impossible.

By dispersing in the polyacetal resin the amino-substituted triazine compound in the form of particles having an average particle size of not more than 1 μm, the thermal aging resistance of the polyacetal resin and the surface appearance of articles molded from the polyacetal resin can be improved, and simultaneously the shrinkage percentage anisotropy after molding can also be minimized.

The method of molding a polyacetal resin composition can be carried out under such conditions that molding is usually effected, for example, at a mold temperature of 30° C. to 90° C. at a cylinder temperature of 170° C. to 230° C., and the conditions can be appropriately varied in these ranges and are not critical.

The particle size of the amino-substituted triazine compound in the polyacetal resin molded article can be observed through an electron microscope. A polyacetal resin composition prepared by adding an amino-substituted triazine compound to a polyacetal resin and melt-kneading the resulting mixture is injection molded and the polyacetal resin molded article obtained is cut, the cut article is sliced to a super thin film having a thickness of 80 nm by means of an ultramicrotome and this film is set on an electron microscope to observe the dispersed particle size of the amino-substituted triazine compound in the film.

As to the surface appearance of molded article, an amino-substituted triazine compound is added to and melt-kneaded with a polyacetal resin to obtain a polyacetal resin composition, this composition is injection molded, the resulting polyacetal resin molded article is allowed to stand in an atmosphere of 23° C. and a 50% humidity (R.H.), and then the state of bleed caused is observed.

The thermal aging resistance can be evaluated by adding an amino-substitute triazine compound to a polyacetal resin, melt-kneading the resulting mixture to obtain a polyacetal resin composition, injection molding the composition to form a polyacetal resin molded article, placing the molded article in a Geer oven set at 150° C. for 40 days, measuring the physical properties of the molded article and determining the retention thereof. Specifically, after the injection molding, the polyacetal resin molded article is allowed to stand for two days in an atmosphere of 23° C. and a 50% humidity (R.H.), and thereafter, the tensile strength of the molded article is measured by a tensile tester. Subsequently, the polyacetal resin molded article which has been allowed to stand for two days in an atmosphere of 23° C. and a 50% humidity (R.H.) is placed in a Geer oven adjusted to 150° C. and taken out after 40 days. The polyacetal resin molded article taken out is placed in an atmosphere of 23° C. and a 50% humidity (R.H.) for two days, and thereafter subjected to measurement of tensile strength by use of a tensile tester to determine the strength retention.

The shrinkage percentage anisotropy of polyacetal resin composition after molding is determined by a ratio of the shrinkage percentage of the composition in the flow direction to that in the transverse direction to the flow direction after the molded article obtained by injection molding the polyacetal resin composition has been allowed to stand for two days in an atmosphere of 23° C. and a 50% humidity (R.H.). The shrinkage percentage anisotropy after molding is determined by the following equation (1):

$$\text{Shrinkage percentage anisotropy after molding} = 1 - \frac{\text{Shrinkage percentage in flow direction}}{\text{Shrinkage percentage in transverse direction}} \quad (1)$$

In order to obtain a polyacetal resin composition molded article having an excellent dimension precision, it is desirable that the shrinkage percentage anisotropy after molding determined from the equation (1) is in the range of ±0.1.

The amino-substituted triazine compound used in this invention includes guanamine(2,4-diamino-sym-triazine), melamine(2,4,6-triamino-sym-triazine), N-butyl-melamine, N-phenylmelamine, N, N-diphenylmelamine, N, N-di-allylmelamine, N,N',N''-triphenylmelamine, melem, mellon, melam, benzoguanamine(2,4-diamino-6-phenyl-sym-triazine), acetoguanamine(2,4-diamino-6-methyl-sym-triazine), 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, N,N,N'N'-tetracyanoethylbenzoguanamine, succinoguanamine, ethylenedimelamine, triguanamine, melamine cyanurate, ethylenedimelamine cyanurate, triguanamine cyanurate, ammeline, acetoguanamine and the like. These triazine derivatives may be used alone or in combination of two or more. Among them, preferred are melamine-(2,4,6-triamino-sym-triazine), guanamine(2,4-diamino-sym-triazine) and benzoguanamine(2,4-diamino-6-phenyl-sym-triazine).

Other stabilizers which can be used in this invention may be additives which are used in conventional polyacetal resins, and include, for example, antioxidants, polymers or compounds containing formaldehyde-reactive nitrogen, formic acid scavenger, weathering (light) stabilizers, mold release agents and the like. These additives are used in a proportion of 0.1 to 5 parts by weight per 100 parts by weight of the polyacetal resin.

The antioxidant which is added to the resin composition of this invention includes n-octadecyl 3-(3', 5'-di-t-butyl-4'-hydroxyphenyl)propionate, n-octadecyl 3-(3'-methyl-5'-t-butyl-4'-hydroxyphenyl)propionate, n-tetradecyl 3-(3',5'-di-t-butyl-4'-hydroxyphenyl)propionate, 1,6-hexanediol bis(3-(3,5-di-t-butyl-4-hydroxyphenyl)propionate), 1,4-butanediol bis(3-(3',5'-di-t-butyl-4'-hydroxyphenyl)propionate), triethylene glycol bis(3-(3'-t-butyl-5'-methyl-4'-hydroxyphenyl)propionate), tetrakis-(methylene-3-(3',5'-di-t-butyl-4'-hydroxyphenyl)propionate)methane, 3,9-bis(2-(3-(3'-t-butyl-4'-hydroxy-5'-methylphenyl)propionyloxy)-1,1-dimethylethyl)-2,4,8,10-tetraoxaspiro(5,5)undecane, N,N'-bis-3-(3',5'-di-t-butyl-4'-hydroxyphenyl)propionyl hexamethylenediamine, N,N'-tetramethylene bis-3-(3'-methyl-5-'-t-butyl-4-hydroxyphenol)propionyldiamine, N,N'-bis(3-(3',5-di-t-butyl-4'-hydroxyphenol)propionyl) hydrazine, N-salicyloyl-N'-salicylidenehydrazine, 3-(N-salicyloyl)amino-1,2,4-triazole, N,N'-bis(2-(3-(3,5-di-butyl-4-hydroxyphenyl)-propionyloxy)ethyl)oxyamide and the like. These antioxidants may be used alone or in combination of two or more and this is not critical.

The polymers or compounds containing formaldehyde-reactive nitrogen include polyamide resins and copolymers thereof, polyacrylamide and its derivatives, copolymers of acrylamide or its derivative with other vinyl monomers. Specifically, the polyamide resin and copolymers thereof include nylon 4,6, nylon 6, nylon 6,6, nylon 6,10, nylon 6,12, nylon 12, nylon 6/6,6/6,10, nylon 6/6,12 and the like. The copolymers of acrylamide or its derivative with other vinyl monomers include poly-β-alanine copolymer obtained by polymerizing them in the presence of a metal alcoholate catalyst. These polymers containing formaldehyde-reactive nitrogen may be used alone or in combination of two or more, and this is not critical.

The formic acid scavenger is at least one member selected from the group consisting of hydroxides, chlorides, inorganic acid salts and carboxylic acid salts of alkali metals and alkaline earth metals, and includes specifically calcium hydroxide, magnesium hydroxide, barium hydroxide, calcium carbonate, magnesium carbonate, barium carbonate, calcium chloride, magnesium chloride, calcium silicate, magnesium silicate, calcium laurate, magnesium laurate, calcium stearate, magnesium stearate, zinc stearate, calcium behenate, magnesium behenate and the like. These formic acid scavengers may be used alone or in combination of two or more, and this is not critical.

The weathering (light) stabilizer is at least one member selected from the group consisting of benzotriazole type ultraviolet absorbers, oxalic acid anilide type ultraviolet absorbers and hindered amine type light stabilizers.

The benzotriazole type ultraviolet absorbers include, for example, 2-(2'-hydroxy-5'-methylphenyl)-benzotriazole, 2-(2'-hydroxy-3',5'-di-t-butylphenyl)benzotriazole, 2-(2'-hydroxy-3',5'-diisoamylphenyl)benzotriazole, 2-(2'-hydroxy-3',5'-bis(α,α-dimethylbenzyl)-phenyl)benzotriazole, 2-(2'-hydroxy-4'-octoxyphenyl)-benzotriazole and the like. The oxalic acid anilide type ultraviolet absorbers include, for example, 2-ethoxy-2'-ethyloxalic acid bisanilide, 2-ethoxy-5-t-butyl-2'-ethyloxalic acid bisanilide, 2-ethoxy-3'-dodecyloxalic acid bisanilide and the like. These ultraviolet absorbers may be used alone or in combination of two or more.

The hindered amine type light stabilizer includes 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidine)carbonate, bis(2,2,6,6-tetramethyl-4-piperidyl)oxalate, bis(2,2,6,6-tetramethyl-4-piperidyl)malonate, bis(2,2,6,6-tetramethyl-4-piperidyl)sebacate, bis(2,2,6,6-tetramethyl-4-piperidyl)adipate, bis(2,2,6,6-tetramethyl-4-piperidyl)terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyl)tolylene-2,4-dicarbamate, bis(2,2,6,6-tetramethyl-4-piperidyl)hexamethylene-1,6-dicarbamate, tris(2,2,6,6-tetramethyl-4-piperidyl)benzene-1,3,5-tricarboxylate, tris(2,2,6,6-tetramethyl-4-piperidyl)benzene-1,3,4-tricarboxylate, 1-(2-(3-(3,5-di-t-butyl-4-hydroxyphenyl)propionyloxy)ethyl)-4-(3-(3,5-di-t-butyl-4-hydroxyphenyl)propionyloxy)-2,2,6,6-tetramethylpiperidine, condensation product of 1,2,3,4-butanetetracarboxylic acid with 1,2,2,6,6-pentamethyl-4-piperidinol and β,β,β',β'-tetramethyl-3,9-(2,4,-8,10-tetraoxaspiro(5,5)undecane)diethanol, and the like. The above hindered amine type light stabilizers may be used alone or in combination of two or more and also in combination with an ultraviolet absorber.

The mold release agent is at least one member selected from the group consisting of fatty acid esters, polyalkylene glycols and amido group-containing aliphatic compounds. The fatty acid ester is a fatty acid ester composed of a polyhydric alcohol and a fatty acid, preferably a fatty acid ester derived from at least one saturated or unsaturated fatty acid having at least 10 carbon atoms and a polyhydric alcohol having 2 to 6 carbon atoms. The polyhydric alcohol used for preparing the fatty acid ester compound is at least one member selected from the group consisting of ethylene glycol, diethylene glycol, triethylene glycol, propylene glycol, dipropylene glycol, butanediol, pentanediol, hexanediol, glycerin, diglycerin, triglycerin, threitol, erythritol, pentaerythritol, arabitol, ribitol, xylitol, sorbitan, sorbitol and mannitol. The saturated fatty acid includes capric acid, lauric acid, myristic acid, palmitic acid, stearic acid, 12-hydroxystearic acid, arachinic acid, behenic acid, lignoceric acid, cerotic acid, montanic acid, melissic acid and ceroplastic acid. The unsaturated fatty acid includes undecylenic acid, oleic acid, elaidic acid, cetoleic acid, erucic acid, brassidic acid, sorbic acid, linoleic acid, linolenic acid, arachidonic acid, propiolic acid, stearolic acid and naturally occurring fatty acids containing these components and mixtures thereof, etc. These fatty acids may be substituted by a hydroxyl group. Among these fatty acid ester compounds, preferred are fatty acid esters derived from fatty acids selected from palmitic acid, stearic acid, behenic acid and montanic acid with polyhydric alcohols selected from glycerin, pentaerythritol, sorbitan and sorbitol. These fatty acid ester compounds may or may not have a hydroxyl group and this is not critical. For example, the fatty acid ester compound may be a monoester, a diester or a triester. The hydroxyl group of the fatty acid ester compound may be blocked with boric acid or the like. Preferable fatty acid ester compounds are glycerin monopalmitate, glycerin dipalmitate, glycerin tripalmitate, glycerin monostearate, glycerin distearate, glycerin tristearate, glycerin monobehenate, glycerin dibehenate, glycerin tribehenate, glycerin monomontanate, glycerin dimontanate, glycerin trimontanate, pentaerythritol monopalmitate, pentaerythritol dipalmitate, pentaerythritol tripalmitate, pentaerythritol tetrapalmitate, pentaerythritol monostearate, pentaerythritol distearate, pentaerythritol tristearate, pentaerythritol tetrastearate, pentaerythritol monobehenate, pentaerythritol dibehenate, pentaerythritol tribehenate, pentaerythritol tetrabehenate, pentaerythritol monomontanate, pentaerythritol dimontanate, pentaerythritol trimontanate, pentaerythritol tetramontanate, sorbitan monopalmitate, sorbitan dipalmitate, sorbitan tripalmitate, sorbitan monostearate, sorbitan distearate, sorbitan tristearate, sorbitan monobehenate, sorbitan dibehenate, sorbitan tribehenate, sorbitan monomontanate, sorbitan dimontanate, sorbitan trimontanate, sorbitol monopalmitate, sorbitol dipalmitate, sorbitol tripalmitate, sorbitol monostearate, sorbitol distearate, sorbitol tristearate, sorbitol monobehenate, sorbitol dibehenate, sorbitol tribehenate, sorbitol monomontanate, sorbitol dimontanate and sorbitol tribehenate. The fatty acid ester compounds whose hydroxyl groups are blocked with boric acid or the like include boric acid esters of glycerin monofatty acid esters (Japanese Patent Application Kokai No. 49-60,762). These fatty acid ester compounds may be used alone or in admixture of two or more.

The polyalkylene glycol includes polyalkylene glycols represented by the general formula (A):

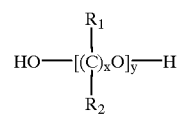

wherein $R_1$ and $R_2$ are selected from the group consisting of hydrogen, alkyl groups having 1 to 6 carbon atoms, substituted $C_{1-6}$alkyl groups, aryl groups, substituted aryl groups and ether groups and may be the same as or different from each other; $x=2-6$ and $y=50-20,000$. Specifically, the polyalkylene glycol includes ethylene oxide, propylene oxide, butylene oxide, epichlorohydrin, styrene oxide, oxetane, 3,3-bis(chloromethyl)oxetane, tetrahydrofuran, 2-methyltetrahydrofuran, oxepane and the like. The number of moles of these alkylene oxides polyadded is within the range of from 50 to 20,000. These polyalkylene glycols may be used alone or in combination of two or more, and this is not critical.

The amido group-containing aliphatic compound is an aliphatic compound represented by the general formula (B):

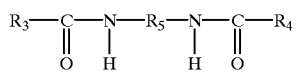

wherein $R_3$ and $R_4$ are alkyl groups having 1 to 30 carbon atoms and $R_5$ is an alkylene group having 2 to 10 carbon atoms, and includes specifically, for example, ethylenebisstearylamide, ethylenebislaurylamide, ethylenebisoleylamide, ethylenebiserucic amide and the like. These amido group-containing aliphatic compounds may be used alone or in combination of two or more.

The amount of the above additive added is, when the thermoplastic resin is a polyacetal resin, 0.1 to 5.0 parts by weight per 100 parts by weight of the polyacetal resin.

Fillers in the form of fiber or particle and pigments can also be added. For example, the fillers include organic and inorganic fillers in the form of fiber or particle. Specifically included are fillers in the form of fiber, such as glass fiber, ceramic fiber, carbon fiber, stainless steel fiber, boron fiber, Kevler fiber, silicon carbide fiber and the like; and fillers in the form of particle such as wollastonite, mica, asbestos, talc, alumina, titanium oxide, magnesium oxide, calcium carbonate, magnesium carbonate, glass beads, boron nitride, silicon carbide and the like. The pigment includes carbon black, acetylene black and the like. These fillers and pigments may be used alone or in combination of two or more and this is not critical.

These additives, fillers and pigments may be added after the melt-kneading of the thermoplastic resin of this invention with an additive for the thermoplastic resin or alternatively may be melt-mixed simultaneously with the melt-mixing of the thermoplastic resin of this invention with an additive for the thermoplastic resin. The melt-mixing is generally effected by use of an extruder. In this case, the temperature of the extruder is appropriately varied in the range of from 130° C. to 330° C. and in such a temperature range that the thermoplastic resin can be extrusion-processed. The extruder may be a single screw extruder or a twin screw extruder.

Examples are shown below to explain this invention in more detail.

The polyacetal resin used in this invention, the formaldehyde content of the polyacetal resin, the particle size of the dispersed particles of amino-substituted triazine compound, the thermal aging resistance and shrinkage percentage anisotropy after molding were evaluated by the following methods.

A. Polyacetal resin

[Production of polyacetal resin (POM-1)]

A 5-liter kneader equipped with two agitating blades and a jacket through which a heating medium was able to be passed was adjusted to 80° C. and therein were placed 3 kg of trioxane containing 15 ppm of water, 1,3-dioxolan having added thereto 100 ppm of a phenol type antioxidant (a-2) in an amount of 0.04 mole per mole of the trioxane and $0.7 \times 10^{-3}$ mole of methylal as a molecular weight modifier and these were mixed. To the resulting mixture was added boron trifluoride dibutyl ether as a polymerization catalyst in an amount of $0.15 \times 10^{-4}$ mole per mole of the trioxane and they were subjected to polymerization. When 30 minutes had passed from the initiation of reaction, a heating medium at 30° C. was passed through the jacket and 2 liters of an aqueous solution containing 1% of triethylamine was added to the polymerization mixture. The catalyst was deactivated for one hour to terminate the reaction. Thereafter, the contents of the kneader were taken out and filtered, and thereafter, the thus obtained filter cake was dried at 100° C. to obtain 2.7 kg of a polyacetal resin. The above procedure was repeated until the total amount of polyacetal resin became 10 kg.

The polyacetal resin obtained was fed to a twin screw extruder (L/D ratio: 32) having one 30-mm vent. Under such conditions that the temperature of the extruder was 200° C., the amount of water introduced into the reaction zone of the extruder and the amount of triethylamine added as the basic substance were 0.2% by weight and 0.1% by weight, respectively, based on the weight of the resin and the vent vacuum degree was 50 Torr, the terminal stabilization of the polyacetal resin and devolatilization were effected to obtain a terminally stabilized polyacetal resin (POM-1) in the form of pellet. The formaldehyde content of the polyacetal resin obtained was 120 ppm and the melt index of the polyacetal resin was 10 g/10 min.

[Production of polyacetal resin (POM-2)]

The same procedure as in the production of polyacetal resin (POM-1) was repeated, except that the vent vacuum degree of the extruder was changed to 100 Torr in the terminal stabilization of polyacetal resin, to obtain a terminally stabilized polyacetal resin (POM-2). The formaldehyde content of the polyacetal resin obtained was 700 ppm and the melt index of the polyacetal resin was 10 g/10 min.

[Production of polyacetal resin (POM-3)]

The same procedure as in the production of polyacetal resin (POM-1) was repeated, except that the vent vacuum degree of the extruder was changed to 200 Torr in the terminal stabilization of the polyacetal resin, to obtain a terminally stabilized polyacetal resin (POM-3). The formaldehyde content of the polyacetal resin obtained (POM-3) was 1,200 pom and the melt index of the polyacetal resin was 10 g/10 min.

[Production of polyacetal resin (POM-4)]

The same procedure as in the production of the polyacetal resin (POM-1) was repeated, except that the vent vacuum degree of the extruder was changed to 300 Torr in the terminal stabilization of the polyacetal resin, to obtain a terminally stabilized polyacetal resin (POM-4). The formaldehyde content of the polyacetal resin obtained (POM-4) was 1,700 ppm and the melt index of the polyacetal resin was 10 g/10 min.

[Production of polyacetal resin (POM-5)]

The same procedure as in the production of the polyacetal resin (POM-1) was repeated, except that the vent vacuum degree of the extruder was changed to 400 Torr in the terminal stabilization of the polyacetal resin, to obtain a terminally stabilized polyacetal resin (POM-5). The formaldehyde content of the polyacetal resin obtained (POM-5) was 2,700 ppm and the melt index of the polyacetal resin was 10 g/10 min.

[Production of polyacetal resin (POM-6)]

A 5-liter kneader equipped with two agitating blades and a jacket through which a heating medium was able to be passed was adjusted to 80° C. and therein were placed 3 kg of trioxane containing 30 ppm of water, 1,3-dioxolan having added thereto 100 ppm of a phenol type antioxidant (a-2) in an amount of 0.04 mole per mole of the trioxane and 0.7×10⁻³ mole of methylal as a molecular weight modifier and these were mixed. To the resulting mixture was added boron trifluoride dibutyl ether as a polymerization catalyst in an amount of 0.15×10⁻⁴ mole per mole of the trioxane and they were subjected to polymerization. When 30 minutes had passed from the initiation of reaction, a heating medium at 30° C. was passed through the jacket and 2 liters of an aqueous solution containing 1% of triethylamine was added to the polymerization mixture. The catalyst was deactivated for one hour to terminate the reaction. Thereafter, the contents of the kneader were taken out and filtered, and thereafter, the thus obtained filter cake was dried at 100° C. to obtain 2.7 kg of a polyacetal resin. The above procedure was repeated until the total amount of polyacetal resin became 10 kg.

The polyacetal resin obtained was fed to a twin screw extruder (L/D ratio: 32) having one 30-mm vent. Under such conditions that the temperature of the extruder was 200° C. and the vent vacuum degree was 50 Torr, devolatilization was effected to obtain a polyacetal resin (POM-6) in the form of pellet. The formaldehyde content of the polyacetal resin obtained was 3,400 ppm and the melt index of the polyacetal resin was 10 g/10 min.

[Production of polyacetal resin (POM-7)]

The same procedure as in the production of the polyacetal resin (POM-6) was repeated, except that the vent of the extruder was open to the air in the pelletization of the polyacetal resin, to obtain a polyacetal resin (POM-7). The formaldehyde content of the polyacetal resin (POM-7) obtained was 5,400 ppm and the melt index of the polyacetal resin was 10 g/10 min.

TABLE 1

| Symbol | Formaldehyde content (ppm) | Melt index (g/10 min) |
| --- | --- | --- |
| POM-1 | 120 | 10 |
| POM-2 | 700 | 10 |
| POM-3 | 1,200 | 10 |
| POM-4 | 1,700 | 10 |
| POM-5 | 2,700 | 10 |
| POM-6 | 3,400 | 10 |
| POM-7 | 5,400 | 10 |

B. Formaldehyde content

To 5 ml of HFIP (hexafluoroisopropanol) was added 100 mg of a polyacetal resin and the latter was completely dissolved in the former at 25° C. in 24 hours. To the resulting solution was added 10 ml of the following acetylacetone solution and they were stirred to be uniformly mixed:

| Acetylacetone solution | |
| --- | --- |
| Ammonium acetate: | 75 g |
| Acetic acid: | 1.5 ml |
| Acetylacetone: | 1 ml |
| Pure water: | 500 ml |

The solution obtained was filtered to remove the polyacetal resin present in the solution and then the filtrate obtained was heat-treated at 80° C. for 10 minutes. Thereafter, the amount of formaldehyde contained in the polyacetal resin was determined using a UV spectrophotometer meter.

C. Particle size of particles of amino-substituted triazine compound dispersed in polyacetal resin molded article From the central portion of a polyacetal resin molded article obtained by molding under the molding conditions shown below was cut a sample having a size of 5×5×3 mm.

Molding conditions

Molding machine: Toshiba IS-80A

Mold temperature: 70° C.

Cylinder temperature: 200° C.

Injection/cooling 25/15 sec

This sample was cut by a diamond cutter (Reichert-Nissei, ULTRACUT N) to obtain a super thin, 0.3-mm square film having a thickness of 80 nm.

This super thin film was set on an electron microscope (JEM-100SX manufactured by Japan Electron Optics Laboratory., magnification: x 5000, accelerating voltage: 80 KV) to observe the particle size of the amino-substituted triazine compound dispersed in the polyacetal resin.

The method of measuring the particle size of dispersed particles was as follows: The particle diameter of each of the amino-substituted triazine compound particles dispersed in a 10-μm square was measured by a scale for an electron microscope and the average particle size was calculated. The results thereof were evaluated based on the standard shown in Table 2.

TABLE 2

| Numeral value | Average diameter of dispersed particle of amino-substituted triazine compound |
| --- | --- |
| 0 | The confirmed presence of dispersed particle each of 0.5 μm or less in average diameter |
| 1 | The confirmed presence of dispersed particle each of 0.5–1.0 μm in average diameter |
| 2 | The confirmed presence of dispersed particle each of 1.0 μm or more in average diameter |

D. Thermal aging resistance

A polyacetal resin composition molded article obtained by molding under the following conditions was placed in a Geer oven set at 150° C., and taken out of the Geer oven after 40 days and subjected to measurement of tensile strength to determine the strength retention:

(a) Molding conditions

Molding machine: Toshiba IS-80A

Mold temperature: 70° C.

Cylinder temperature: 200° C.

Injection/cooling=25/15 sec (b) Physical properties-measuring conditions after aging Tensile tester: Autograph AG-1000B manufactured by Shimadzu Corp.

Drawing speed: 5 mm/min

E. Shrinkage percentage anisotropy after molding

The conditions for molding a polyacetal resin composition and equation for calculating the shrinkage percentage anisotropy after molding are shown below.

(a) Molding conditions

Molding machine: Toshiba IS-80A

Cylinder temperature: 200° C.

Mold temperature: 77° C.

Molding cycle: Injection/cooling 15/25 sec

Mold dimension: 130 mm in resin flow direction 110 mm in transverse direction 3 mm in thickness (b) Equation for calculating shrinkage percentage anisotropy after molding After the molding under the above molding conditions, the molded article was allowed to stand at 23° C. at a 50% humidity (R.H.) for 2 days, and the changes of dimension of the molded article in the resin flow direction and the transverse direction were determined.

The shrinkage percentage anisotropy was calculated by the following equation (1):

$$\text{Shrinkage percentage anisotropy after molding} = 1 - \frac{\text{Shrinkage percentage in flow direction}}{\text{Shrinkage percentage in transverse direction}} \quad (1)$$

F. Surface appearance of polyacetal resin molded article (presence of bleed)

The conditions for molding a polyacetal resin composition are shown below.

(a) Molding conditions
  Molding machine: Toshiba IS-80A
  Cylinder temperature: 200° C.
  Mold temperature: 70° C.
  Molding cycle: Injection/cooling=15/25 sec
  Mold dimension: 130 mm in resin flow direction 110 mm in transverse direction 3 mm in thickness A polyacetal resin molded article obtained by molding under the above conditions was allowed to stand under an atmosphere of 230° C. and 50% humidity (R.H.) and presence of bleed was observed for one month. The surface appearance was evaluated based on the standard shown in Table 3.

TABLE 3

| Numeral value | Degree of bleed |
|---|---|
| 0 | When molded article was allowed to stand in isothermic room for one month and then touched, no adhesion was seen. |
| 1 | When molded article was allowed to stand in isothermic room for one month and then touched, slight adhesion was seen. |
| 2 | When molded article was allowed to stand in isothermic room for one month and then touched, slight adhesion was seen, but when allowed to stand for 2 weeks, no adhesion was seen. |
| 3 | When molded article was allowed to stand in isothermic room for 2 weeks, slight adhesion was seen, but when allowed to stand for one week, no adhesion was seen. |
| 4 | When molded article was allowed to stand in isothermic room for 1 week and then touched, white adhesion was seen, but when allowed to stand for 2 days, no adhesion was seen. |

G. Additive used
(1) Hindered phenol type antioxidant
  a-1: Triethylene glycol bis(3-(3-t-butyl-5-methyl-4-hydroxyphenyl)propionate)
  a-2: Tetrakis(methylene-3-(3',5'-di-t-butyl-4'-hydroxyphenyl)propionate)methane
(2) Formaldehyde-reactive nitrogen-containing polymer
  b-1: Nylon 6,6
(3) Formic acid scavenger
  c-1: Calcium stearate
(4) Weathering (light) stabilizer
  d-1: 2-(2'-Hydroxy-3',5'-bis($\alpha,\alpha$-dimethylbenzyl)phenyl)-2H-benzotriazole
  d-2: Bis(2,2,6,6-tetramethyl-4-piperidine)-sebacate
  d-3: Condensation product of 1,2,3,4-butanetetracarboxylic acid, 1,2,2,6,6-pentamethyl-4-piperidinol and $\beta,\beta,\beta',\beta'$-tetramethyl-3,9-(2,4,8,10-tetraoxaspiro(5,5)-undecane)diethanol
(5) Mold release agent
  e-1: Glycerin monostearate
  e-2: Polyethylene glycol (molecular weight of 6,000)
  e-3: Ethylenebisstearylamide
(6) Amino-substituted triazine compound
  f-1: Melamine (particle size: 4.5 $\mu$m)
  f-2: Benzoguanamine (particle size: 4.3 $\mu$m)
  f-3: Guanamine (particle size: 4.2 $\mu$m)
(7) Reaction product of amino-substituted triazine compound with formaldehyde
  g-1: Methylolmelamine (soluble in warm water, m.p.: 160° C.)

H. Productivity

A melt-kneaded mixture of a polyacetal resin and an amino-substituted triazine compound was continuously pelletized under the following conditions, and the results obtained were evaluated based on the standard shown in Table 4.

Pelletization conditions
  Extruder: 30Φ twin screw extruder (L/D ratio: 32) with vent
  Cylinder temperature: 200° C.
  Number of revolutions of screw: 100 rpm
  Vent vacuum degree: 50 Torr
  Dies screen: 60 mesh, 2 sheets Under the above conditions, pelletization was conducted; elevation of resin pressure in dies portion and reduction of discharged amount were observed; and the productivity was evaluated.

TABLE 4

| Numeral value | Standard for judging productivity |
|---|---|
| 0 | No rise of resin pressure in dies portion of extruder was seen and pelletization was able to be continuously conducted for 8 hrs. |
| 1 | After 5 hrs from starting of pelletization, resin pressure in dies portion was quick elevated. The dies portion was slightly blocked, but pelletization was possible. |
| 2 | Resin pressure was quick elevated in dies portion 3–4 hrs after the starting of pelletization, and the dies portion was completely blocked. Further pelletization was impossible. |

EXAMPLE 1

In a 3-liter small size Henschel mixer were placed 100 parts by weight of a polyacetal resin (POM-4) having a formaldehyde content of 1,700 ppm and 0.3 part by weight of melamine, and were mixed at 860 rpm for 2 minutes and then discharged. The mixture thus obtained was fed to a twin screw extruder (L/D ratio: 32) having one 30-mm vent. The temperature of the extruder at this time was 200° C. and the mixture was extruded at a discharge rate of 5 kg/hr at 100 rpm (residence time: 35 sec) at a vent vacuum degree of 50 Torr to be pelletized. The pelletization was continuously conducted under the above conditions for 8 hours. As a result, the resin pressure of the dies portion of the extruder was not elevated and extrusion was stably conducted. The pellets obtained were dried at 80° C. for 5 hours, thereafter placed in an IS-80A molding machine manufactured by Toshiba Machine Co., Ltd. and then subjected to molding to obtain a dumbbell test specimen and a flat plate molded article. These molded articles were allowed to stand in an atmosphere of 23° C. and a 50% humidity (R.H.) for 2 days. The dumbbell test specimen was subjected to evaluation of the size of dispersed particles of amino-substituted triazine compound and thermal aging resistance and the flat plate molded article was subjected to evaluation of shrinkage percentage anisotropy after molding. The results obtained are shown in Table 5.

EXAMPLES 2 TO 7 AND COMPARATIVE EXAMPLES 1 AND 2

The same procedure as in Example 1 was repeated, except that the amount of melamine added was changed. The results obtained are shown in Table 5.

EXAMPLE 12

In a 3-liter small size Henschel mixer were placed 100 parts by weight of a polyacetal resin (POM-4) having a formaldehyde content of 1,700 ppm, 0.3 part by weight of melamine, 0.3 part by weight of a phenol type antioxidant (a-1), 0.05 part by weight of nylon 6,6 and 0.2 part by weight of glycerin monostearate. They were mixed at 860 rpm for 2 minutes and then discharged. The mixture thus obtained was fed to a twin screw extruder (L/D ratio: 32) having one 30-mm vent. The temperature of the extruder at this time was 200° C. and the mixture was extruded at a discharge rate of 5 kg/hr at 100 rpm (residence time: 35 sec) at a vent vacuum degree of 50 Torr to be pelletized. The pellets obtained were dried at 80° C. for 5 hours and thereafter

TABLE 5

| | Polyacetal resin | | Amino-substituted triazine | | Size of dispersed particle | Molded article surface bleed | 150° C. × 40 days strength retention (%) | Shrinkage percentage anisotropy after molding | Productivity |
|---|---|---|---|---|---|---|---|---|---|
| | Kind | Amount (part) | Kind | Amount (part) | | | | | |
| Ex. 1 | POM-4 | 100 | f-1 | 0.3 | 0 | 0 | 96 | ±0 | 0 |
| Ex. 2 | POM-4 | 100 | f-1 | 0.01 | 0 | 0 | 82 | +0.10 | |
| Ex. 3 | POM-4 | 100 | f-1 | 0.05 | 0 | 0 | 89 | +0.04 | |
| Ex. 4 | POM-4 | 100 | f-1 | 0.1 | 0 | 0 | 95 | +0.01 | |
| Ex. 5 | POM-4 | 100 | f-1 | 0.5 | 0 | 0 | 98 | −0.01 | |
| Ex. 6 | POM-4 | 100 | f-1 | 1.0 | 0 | 0 | 98 | −0.04 | |
| Ex. 7 | POM-4 | 100 | f-1 | 3.0 | 1 | 1 | 94 | −0.10 | |
| Comp. Ex. 1 | POM-4 | 100 | Not added | 0 | — | — | 30 | +0.13 | |
| Comp. Ex. 2 | POM-4 | 100 | f-1 | 5.0 | 2 | 3 | 76 | −0.15 | 1 |

EXAMPLES 8 AND 9

The same procedure as in Example 1 was repeated, except that the kind of the amino-substituted triazine compound was changed. The results obtained are shown in Table 6.

EXAMPLES 10 AND 11 AND COMPARATIVE EXAMPLES 3 TO 6

The same procedure as in Example 1 was repeated, except that the kind of the polyacetal resin was changed. The results obtained are shown in Table 6.

placed in an IS-80A molding machine manufactured by Toshiba Machine Co., Ltd. and subjected to molding to obtain a dumbbell test specimen and a flat plate molded article. These molded articles were allowed to stand in an atmosphere of 23° C. and a 50% humidity (R.H.) for 2 days. The dumbbell test specimen was subjected to evaluation of the size of dispersed particles of amino-substituted triazine compound and thermal aging resistance and the flat plate molded article was subjected to evaluation of shrinkage percentage anisotropy. The results obtained are shown in Table 7.

TABLE 6

| | Polyacetal resin | | Amino-substituted triazine | | Size of dispersed particle | Molded article surface bleed | 150° C. × 40 days strength retention (%) | Shrinkage percentage anisotropy after molding |
|---|---|---|---|---|---|---|---|---|
| | Kind | Amount (part) | Kind | Amount (part) | | | | |
| Ex. 8 | POM-4 | 100 | f-2 | 0.3 | 0 | 0 | 94 | ±0 |
| Ex. 9 | POM-4 | 100 | f-3 | 0.3 | 0 | 0 | 93 | ±0 |
| Ex. 10 | POM-3 | 100 | f-1 | 0.3 | 0 | 0 | 96 | ±0 |
| Ex. 11 | POM-5 | 100 | f-1 | 0.3 | 0 | 0 | 96 | −0.01 |
| Comp. Ex. 3 | POM-1 | 100 | f-1 | 0.3 | Nothing | 4 | 71 | +0.13 |
| Comp. Ex. 4 | POM-2 | 100 | f-1 | 0.3 | Nothing | 3 | 79 | +0.11 |
| Comp. Ex. 5 | POM-6 | 100 | f-1 | 0.3 | 2 | 0 | 81 | −0.12 |
| Comp. Ex. 6 | POM-7 | 100 | f-1 | 0.3 | 2 | 0 | 78 | −0.18 |

EXAMPLE 13

In a 3-liter small size Henschel mixer were placed 100 parts by weight of a polyacetal resin (POM-4) having a formaldehyde content of 1,700 ppm, 0.3 part by weight of melamine, 0.5 part by weight of 2-(2-hydroxy-3,5-bis(α,α-dimethylbenzyl)phenyl)-2H-benzotriazole, 0.25 part by weight of bis(2,2,6,6-tetramethyl-4-piperidyl)-sebacate, 0.05 by weight of ethylenebisstearylamide and 0.05 part by weight of nylon 6,6. They were mixed at 860 rpm for 2 minutes and then discharged. The mixture thus obtained was fed to a twin screw extruder (L/D ratio: 32) having one 30-mm vent. The temperature of the extruder at this time was 200° C. and the mixture was extruded at a discharge rate of 5 kg/hr at a vent vacuum degree of 50 Torr while the screw was rotated at 100 rpm (residence time: 35 sec) to be pelletized. The pellets obtained were dried at 80° C. for 5 hours, thereafter placed in an IS-80A molding machine manufactured by Toshiba Machine Co., Ltd. and then subjected to molding to obtain a dumbbell test specimen and a flat plate molded article. These molded articles were allowed to stand in an atmosphere of 23° C. and a 50% humidity (R.H.) for 2 days. The dumbbell test specimen was subjected to evaluation of the size of dispersed particles of amino-substituted triazine compound and thermal aging resistance and the flat plate molded article was subjected to evaluation of shrinkage percentage anisotropy. The results obtained are shown in Table 7.

EXAMPLE 14

In a 3-liter small size Henschel mixer were placed 100 parts by weight of a polyacetal resin (POM-4) having a formaldehyde content of 1,700 ppm, 0.3 part by weight of melamine, 0.5 part by weight of 2-(2-hydroxy-3,5-bis(α,α-dimethylbenzyl)phenyl)-2H-benzotriazole, 0.25 part by weight of bis(2,2,6,6-tetramethyl-4-piperidyl)-sebacate, 0.05 part by weight of ethylenebisstearylamide, 0.05 part by weight of nylon 6,6, 0.25 part by weight of a condensation product of 1,2,3,4-butanetetracarboxylic acid with 1,2,2,6,6-pentamethyl-4-piperidinol and β,β,-β',β'-tetramethyl-3,9-(2,4,8,10-tetraoxaspiro(5,5)undecane)diethanol and 1.0 part by weight of polyethylene glycol (molecular weight: 6,000). They were mixed at 860 rpm for 2 minutes and then discharged. The mixture thus obtained was fed to a twin screw extruder (L/D ratio: 32) having one 30-mm vent. The temperature of the extruder at this time was 200° C. and the mixture was extruded at a discharge rate of 5 kg/hr at a vent vacuum degree of 50 Torr while the screw was rotated at 100 rpm (residence time: 35 sec) to be pelletized. The pellets obtained were dried at 80° C. for 5 hours and thereafter placed in an IS-80A molding machine manufactured by Toshiba Machine Co., Ltd. and subjected to molding to obtain a dumbbell test specimen and a flat plate molded article. These molded articles were allowed to stand in an atmosphere of 23° C. and a 50% humidity (R.H.) for 2 days. The dumbbell test specimen was subjected to evaluation of the size of dispersed particles of amino-substituted triazine compound and thermal aging resistance and the flat plate molded article was subjected to evaluation of shrinkage percentage anisotropy. The results obtained are shown in Table 7.

EXAMPLE 15

In a 3-liter small size Henschel mixer were placed 100 parts by weight of a polyacetal resin (POM-4) having a formaldehyde content of 1,700 ppm, 0.3 part by weight of melamine, 0.3 part by weight a phenol type antioxidant (a-1), 0.05 part by weight of nylon 6,6, 0.2 part by weight of glycerin monostearate and 0.05 part by weight of calcium stearate, and were mixed at 860 rpm for 2 minutes and then discharged. The mixture thus obtained was fed to a twin screw extruder (L/D ratio: 32) having one 30-mm vent. The temperature of the extruder at this time was 200° C. and the mixture was extruded at a discharge rate of 5 kg/hr at a vent vacuum degree of 50 Torr while the screw was rotated at 100 rpm (residence time: 35 sec) to be pelletized. The pellets obtained were dried at 80° C. for 5 hours and thereafter placed in an IS-80A molding machine manufactured by Toshiba Machine Co., Ltd. and subjected to molding to obtain a dumbbell test specimen and a flat plate molded article. These molded articles were allowed to stand in an atmosphere of 23° C. and a 50% humidity (R.H.) for 2 days. The dumbbell test specimen was subjected to evaluation of the size of dispersed particles of amino-substituted triazine compound and thermal aging resistance and the flat plate molded article was subjected to evaluation of shrinkage percentage anisotropy. The results obtained are shown in Table 7.

TABLE 7

| | Polyacetal resin | | Amino-substituted triazine | | Antioxidant | | Amide compd. | | Mold release agent | |
|---|---|---|---|---|---|---|---|---|---|---|
| | Kind | Amount (part) | Kind | Amount (part) | Kind | Amount (part) | Kind | Amount (part) | Kind | Amount (part) |
| Ex. 12 | POM-4 | 100 | f-1 | 0.3 | a-1 | 0.3 | b-1 | 0.05 | e-1 | 0.2 |
| Ex. 13 | POM-4 | 100 | f-1 | 0.3 | | | b-1 | 0.05 | e-3 | 0.05 |
| Ex. 14 | POM-4 | 100 | f-1 | 0.3 | | | b-1 | 0.05 | e-3 | 0.05 |
| | | | | | | | | | e-2 | 1.0 |
| Ex. 15 | POM-4 | 100 | f-1 | 0.3 | a-1 | 0.3 | b-1 | 0.05 | e-1 | 0.2 |

| | Weathering stabilizer | | Formic acid scavenger | | Size of dispersed particle | Molded article surface bleed | 150° C. × 40 days strength retention (%) | Shrinkage percentage anisotropy after molding |
|---|---|---|---|---|---|---|---|---|
| | Kind | Amount (part) | Kind | Amount (part) | | | | |
| Ex. 12 | | | | | 0 | 0 | 100 | ±0 |
| Ex. 13 | d-1 | 0.5 | | | 0 | 0 | 100 | ±0 |
| | d-2 | 0.25 | | | | | | |
| Ex. 14 | d-1 | 0.5 | | | 0 | 0 | 100 | ±0 |

TABLE 7-continued

|  | d-2 | 0.25 |  |  |  |  |  |  |
|--|-----|------|--|--|--|--|--|--|
|  | d-3 | 0.25 |  |  |  |  |  |  |
| Ex. 15 |  |  | c-1 | 0.05 | 0 | 0 | 100 | ±0 |

Comparative Example 7

In a 3-liter small size Henschel mixer were placed 100 parts by weight of a polyacetal resin (POM-1) having a formaldehyde content of 120 ppm and 0.3 part by weight of methylolmelamine (particle size: 35 μm), and were mixed at 860 rpm for 2 minutes and then discharged. The mixture thus obtained was fed to a twin screw extruder (L/D ratio: 32) having one 30-mm vent. The temperature of the extruder at this time was 200° C. and the mixture was extruded at a discharge rate of 5 kg/hr at a vent vacuum degree of 50 Torr while the screw was rotated at 100 rpm (residence time: 35 sec) to be pelletized. As a result, the resin pressure at the die portion of the extruder was quickly elevated three hours after the starting of pelletization and when the pelletization was further continued, the die portion was blocked and it was impossible to conduct the pelletization any further. The results obtained are shown in Table 8.

Comparative Example 8

In a 3-liter small size Henschel mixer were placed 100 parts by weight of a polyacetal resin (POM-1) having a formaldehyde content of 120 ppm, 0.1 part by weight of methylolmelamine (particle size: 35 μm) and 0.2 part by weight of melamine, and were mixed at 860 rpm for 2 minutes and then discharged. The mixture thus obtained was pelletized under the same conditions as in Comparative Example 7, upon which the resin pressure at the die portion of the extruder was elevated in 4 hours, and the dies portion was blocked, whereby the pelletization became impossible. The results obtained are shown in Table 8.

TABLE 8

|  | Polyacetal resin | | Amino-substituted triazine | | |
|--|------|--------|------|--------|--------------|
|  | Kind | Amount (part) | Kind | Amount (part) | Productivity |
| Comp. Ex. 7 | POM-1 | 100 | g-1 | 0.3 | 2 |
| Comp. Ex. 8 | POM-1 | 100 | f-1 | 0.2 | 2 |
|  |  |  | g-1 | 0.1 |  |

EXAMPLE 16

The pellets obtained in Example 1 were further fed to a twin screw extruder having one 30-mm vent (L/D ratio: 32) and pelletized. In this case, the temperature of the extruder was 200° C., the discharging rate was 5 kg/hr, the number of revolution of screw was 100 rpm and the vent vacuum degree was 50 Torr. This operation was repeated 5 times in total (5 times at a residence time of 35 sec=175 sec). The pellets were dried at 80° C. for 5 hours, and thereafter fed to an IS-80A molding machine manufactured by Toshiba Chemical Co., Ltd. to prepare a dumbbell test specimen. This molded article was allowed to stand in an atmosphere of 23° C. and a 50% humidity (R.H.) for 2 days and then subjected to observation of dispersed particles of the amino-substituted triazine compound. The results obtained are shown in Table 9.

EXAMPLE 17

The pellets obtained in Example 1 were further fed to a twin screw extruder having one 30-mm vent (L/D ratio: 32) and pelletized. In this case, the temperature of the extruder was 200° C., the discharging rate was 5 kg/hr, the number of revolution of screw was 100 rpm and the vent vacuum degree was 50 Torr. This operation was repeated 7 times in total (7 times at a residence time of 35 sec 245 sec). The pellets were dried at 80° C. for 5 hours, and thereafter fed to an IS-80A molding machine manufactured by Toshiba Chemical Co., Ltd. to prepare a dumbbell test specimen. This molded article was allowed to stand in an atmosphere of 23° C. and a 50% humidity (R.H.) for 2 days and then subjected to observation of dispersed particles of the amino-substituted triazine compound. The results obtained are shown in Table 9.

Comparative Example 9

The pellets obtained in Example 1 were further fed to a twin screw extruder having one 30-mm vent (L/D ratio: 32) and pelletized. In this case, the temperature of the extruder was 200° C., the discharging rate was 5 kg/hr, the number of revolution of screw was 100 rpm and the vent vacuum degree was 50 Torr. This operation was repeated 10 times in total (10 times at a residence time of 35 sec=350 sec). The pellets were dried at 80° C. for 5 hours, and thereafter fed to an IS-80A molding machine manufactured by Toshiba Chemical Co., Ltd. to prepare a dumbbell test specimen. This molded article was allowed to stand in an atmosphere of 23° C. and a 50% humidity (R.H.) for 2 days and then subjected to observation of dispersed particles of the amino-substituted triazine compound. The results obtained are shown in Table 9.

TABLE 9

|  | Polyacetal resin | | Amino-substituted triazine | | Size of |
|--|------|--------|------|--------|-----------|
|  | Kind | Amount (part) | Kind | Amount (part) | Dispersed particle |
| Ex. 16 | POM-4 | 100 | f-1 | 0.3 | 0 |
| Ex. 17 | POM-4 | 100 | f-1 | 0.3 | 1 |
| Comp. Ex. 9 | POM-4 | 100 | f-1 | 0.3 | 2 |

As is clear from Tables 5 to 9, by dispersing the amino-substituted triazine compound in the form of particles having a particle size of not more than 1 μm in the polyacetal resin, the thermal aging resistance of the polyacetal resin molded article was enhanced greatly. Also, the shrinkage percentage anisotropy after molding was simultaneously made small.

Evaluation of weather resistance

With 100 parts by weight of the polyacetal resin composition pellets obtained in Example 13 or 14 was blended 0.2 part by weight of carbon black (acetylene black) and the resulting blend was melt-kneaded in a single screw extruder having a screw of 30 mm in diameter (free from vent, L/D ratio: 22). In this case, the extrusion temperature was 200°

C., the number of revolution of screw was 100 rpm and the discharging rate was 3 kg/hr. The colored pellets obtained were dried at 80° C. for 5 hours, and thereafter, subjected to an injection machine to obtain a flat plate (67×13×3 mm). The molding machine and molding conditions used in this case were as follows:

Molding machine: IS-100E-3A manufactured by Toshiba Chemical Co., Ltd.

Cylinder temperature: 200° C.

Mold temperature: 70° C.

Injection/cooling=25/15 sec

The flat plate obtained above was subjected to a weathering test under the following conditions and the discoloration (ΔE) was observed by the following apparatus:

(Weathering test)

Tester: EL-SUN-HC-B.EM TYPE fadeometer manufactured by Suga Tester

Black panel temperature: 83° C.

Exposure time: 400 hrs (Discoloration)

Tester: Handy color tester HC-T manufactured by Suga Tester

The light irradiated surface of the flat plate was observed by a microscope of a magnification of 100 to check the presence of crack.

As a result, no difference in the degree of discoloration (ΔE) was found in any of the samples and no crack was found.

What is claimed is:

1. A polyacetal resin molded article in which an amino-substituted triazine compound is dispersed in the form of particles having an average particle size of not more than 1 μm in the polyacetal resin, wherein the size of the particles is determined by cutting said article into a film of 80 nm in thickness and observed through an electron microscope at a magnification of 5,000 at 80 kV in a 10-μm square; and wherein the article can be obtained by melt-kneading 100 parts by weight of a polyacetal resin composition comprising 100 parts by weight of a polyacetal resin having a formaldehyde content of 1,000 to 3,000 ppm with 0.01 to 3.0 parts by weight of at least one amino-substituted triazine compound and 0.1 to 5.0 parts by weight of at least one member selected from the group consisting of antioxidant, formaldehyde-reactive nitrogen-containing polymer or compound, formic acid scavenger, weathering (light) stabilizer and mold releasing agent and then molding the resulting mixture.

2. The polyacetal resin molded article according to claim 1, wherein the antioxidant is at least one hindered phenol type antioxidant.

3. The polyacetal resin molded article according to claim 1, wherein the formaldehyde-reactive nitrogen-containing polymer or compound is at least one member elected from the group consisting of polyamide resin, polyacrylamide, polyacrylamide derivative, copolymer of acrylamide and another vinyl monomer.

4. The polyacetal resin molded article according to claim 1, wherein the formic acid scavenger is at least one member selected from the group consisting of hydroxides, chlorides, inorganic acid salts and carboxylic acid salts of alkali metals and alkaline earth metals.

5. The polyacetal resin molded article according to claim 1, wherein the weathering (light) stabilizer is at least one member selected from the group consisting of a benzotriazole type ultraviolet absorber, an oxalic acid anilide type ultraviolet absorber and a hindered amine type light stabilizer.

6. The polyacetal resin molded article according to claim 1, wherein the mold releasing agent is at least one member selected from the group consisting of fatty acids, fatty acid esters, polyalkylene glycols and amido group-containing aliphatic compounds.

7. A process for producing a polyacetal resin molded article, comprising melt-kneading 100 parts by weight of a polyacetal resin having a formaldehyde content of 1,000 to 3,000 ppm with 0.01 to 3.0 parts by weight of at least one amino-substituted triazine compound and then molding the resulting mixture, wherein the time of melt-kneading the polyacetal resin with the amino-substituted triazine compound is 250 seconds or less.

8. A polyacetal resin molded article in which an amino-substituted triazine compound is dispersed in the form of particles having an average particle size of not more than 1 μm in the polyacetal resin, wherein the article can be obtained by melt-kneading 100 parts by weight of a polyacetal resin composition comprising 100 parts by weight of a polyacetal resin having a formaldehyde content of 1,000 to 3,000 ppm with 0.01 to 3.0 parts by weight of at least one amino-substituted triazine compound and 0.1 to 5.0 parts by weight of at one member selected from the group consisting of antioxidant, formaldehyde-reactive nitrogen-containing polymer or compound, formic acid scavenger, weathering (light) stabilizer and mold releasing agent and then molding the resulting mixture.

9. A polyacetal resin molded article in which an amino-substituted triazine compound is dispersed in the form of particles having an average particle size of not more than 1 μm in the polyacetal resin, wherein the article can be obtained by melt-kneading for 250 second or less a polyacetal resin having a formaldehyde content of 1,000 to 3,000 ppm with at least one amino-substituted triazine compound and at least one member selected from the group consisting of antioxidant, formaldehyde-reactive nitrogen-containing polymer or compound, formic acid scavenger, weathering (light) stabilizer and mold releasing agent and then molding the resulting mixture.

10. A process for producing a polyacetal resin molded article, comprising steps of (1) adjusting formaldehyde content of 1,000 to 3,000 ppm in a polyacetal resin;

(2) melt-kneading the polyacetal resin of step (1) with at least one amino-substituted triazine compound for 250 sec or less; and (3) molding the resulting mixture.

* * * * *